(12) United States Patent
Ikeda (10) Patent No.: US 7,948,855 B2
(45) Date of Patent: May 24, 2011

(54) OPTICAL PICKUP

(75) Inventor: Atsushi Ikeda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 936 days.

(21) Appl. No.: 11/897,529

(22) Filed: Aug. 30, 2007

(65) Prior Publication Data

US 2008/0068973 A1 Mar. 20, 2008

(30) Foreign Application Priority Data

Aug. 30, 2006 (JP) ................................. 2006-233097

(51) Int. Cl.
*G11B 7/135* (2006.01)
*G11B 7/00* (2006.01)
(52) U.S. Cl. .............. 369/112.09; 369/103; 369/112.03; 369/112.1; 369/112.14; 369/112.15; 369/112.16; 369/112.21; 369/112.27; 369/112.29
(58) Field of Classification Search ............. 369/112.03, 369/103, 112.09, 112.1, 112.14, 112.15, 369/112.16, 112.21, 112.27, 112.29
See application file for complete search history.

(56) References Cited

U.S. PATENT DOCUMENTS

| | | | | |
|---|---|---|---|---|
| 5,883,741 A * | 3/1999 | Ono et al. | ...................... | 359/495 |
| 7,180,846 B2 * | 2/2007 | Kim et al. | ................. | 369/112.17 |
| 7,542,397 B2 * | 6/2009 | Ogasawara et al. | ...... | 369/112.02 |
| 2001/0036137 A1 * | 11/2001 | Katayama | .................. | 369/53.19 |
| 2003/0043724 A1 * | 3/2003 | Kim | ......................... | 369/112.14 |
| 2004/0218502 A1 * | 11/2004 | Kim et al. | ................ | 369/112.01 |
| 2005/0122881 A1 | 6/2005 | Aiki | | |

FOREIGN PATENT DOCUMENTS

| | | |
|---|---|---|
| JP | 2004-103135 | 4/2004 |
| JP | 2004-139709 | 5/2004 |

OTHER PUBLICATIONS

Patent Abstracts of Japan for Japanese Publication No. 2004-103135, Publication date Apr. 2, 2004 (1 page).

* cited by examiner

*Primary Examiner* — Craig A. Renner
*Assistant Examiner* — Aneeta Yodichkas
(74) *Attorney, Agent, or Firm* — Osha Liang LLP (57) ABSTRACT

A multiple wavelength-adaptive optical pickup according to the present invention enables to obtain stable signals by suppressing displacement of optical intensity distribution at a light receiving section. When an incident angle of a central beam of a zero-dimensional beam of a beam reflected at an optical disc into a half mirror is taken as $\theta$, if variation in transmittance of the mirror become a maximum with respect to change in the incident angle from $\theta$ to a plus side in any one of the wavelengths corresponding to the respective optical discs, a $-1$ dimensional beam generated on the minus side with respect to the zero-dimensional beam is received by the light receiving section, and if the variation in the transmittance of the mirror become the maximum with respect to change in the incident angle from $\theta$ to the minus side, a $+1$ dimensional beam generated on the plus side with respect to the zero-dimensional beam is received by the light receiving section. These received one-dimensional beams are used for detection of signals for servo control.

2 Claims, 7 Drawing Sheets

OPTICAL PICKUP

BACKGROUND OF THE INVENTION

1. Field of the Invention

The present invention relates to an optical pickup used for reading information on an optical disc in a DVD recorder, a personal computer or the like.

2. Description of the Related Art

As image or audio recording media, optical discs such as a DVD (digital versatile disc) and a CD (compact disc) have come into widespread use today. Further, recently, new optical discs such as a Blu-ray Disc (trademark) and a HD-DVD (high definition digital versatile disc) capable of recording larger-capacity data have appeared.

In such a optical disc, reading information and servo control are performed by projecting laser beam with a predetermined wavelength on an information recording surface of the disc and receiving reflected beam of the laser beam. The wavelength of the laser beam varies in accordance with the species of optical discs. For example, infrared laser beam with a wavelength of 780 nm is used for a CD, red laser beam with a wavelength of 650 nm is used for a DVD, and blue laser beam with a wavelength of 410 nm is used for a BD (Blu-ray Disc) and a HD-DVD, respectively. Therefore, also in an optical pickup, compatibility with a plurality of media is required.

Japanese Unexamined Patent Publication No. 2004-139709 discloses an optical pickup including two laser beam sources so as to record and reproduce for both the CD and the DVD. Japanese Unexamined Patent Publication No. 2004-103135 discloses an optical pickup including three laser beam sources so as to record and reproduce for a BD in addition to a CD and a DVD.

Generally, an optical pickup is constructed so as to project laser beam from a light source on an information recording surface of an optical disc through a beam splitter and to receive beam reflected at the information recording surface by a light receiving section through the beam splitter. As the beam splitter, for example, a half mirror (hereinafter, also referred to as just a "mirror") is used, and transmittance of the mirror depends on the wavelength of the laser beam and also depends on an incident angle of the laser beam into the mirror.

Figure 6:
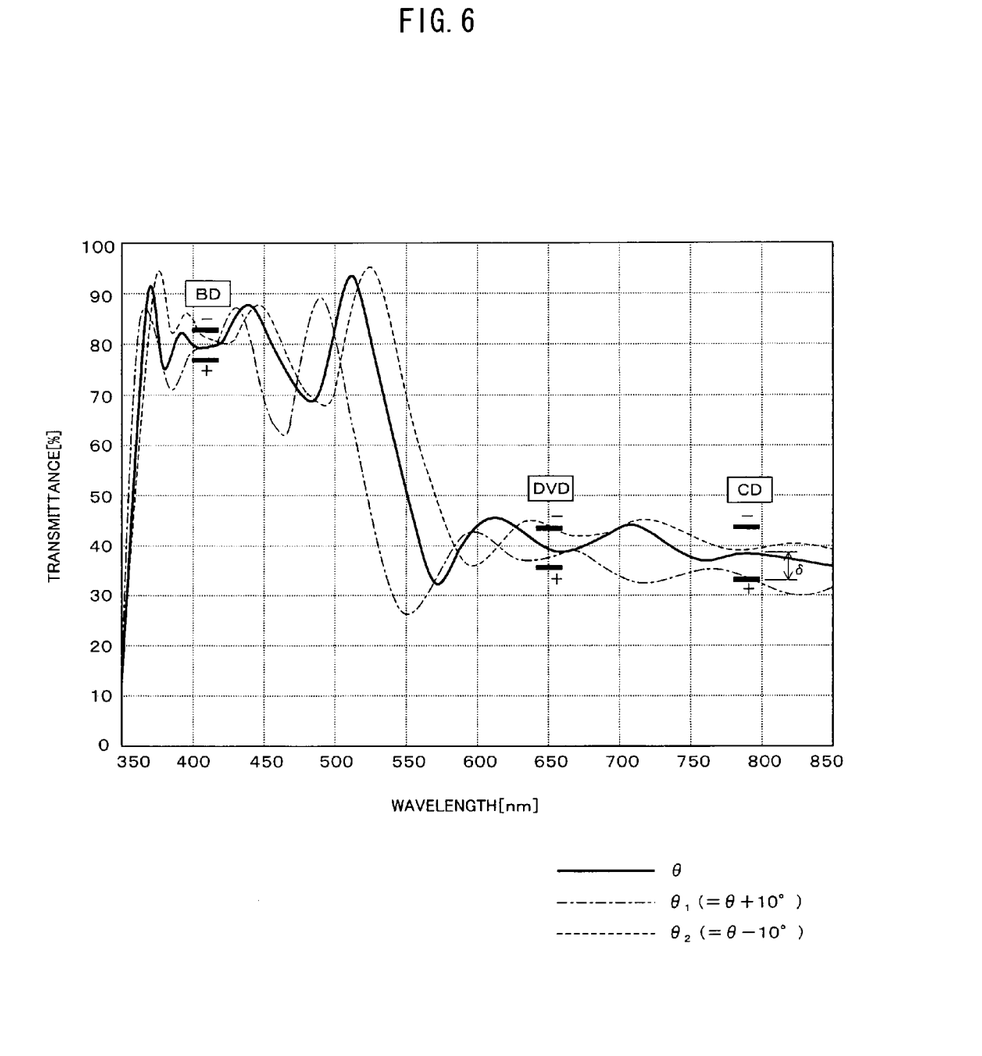
FIG. 6 shows graphs showing an example of wavelength dependency and incident angle dependency of transmittance of a mirror.
Figure 7:
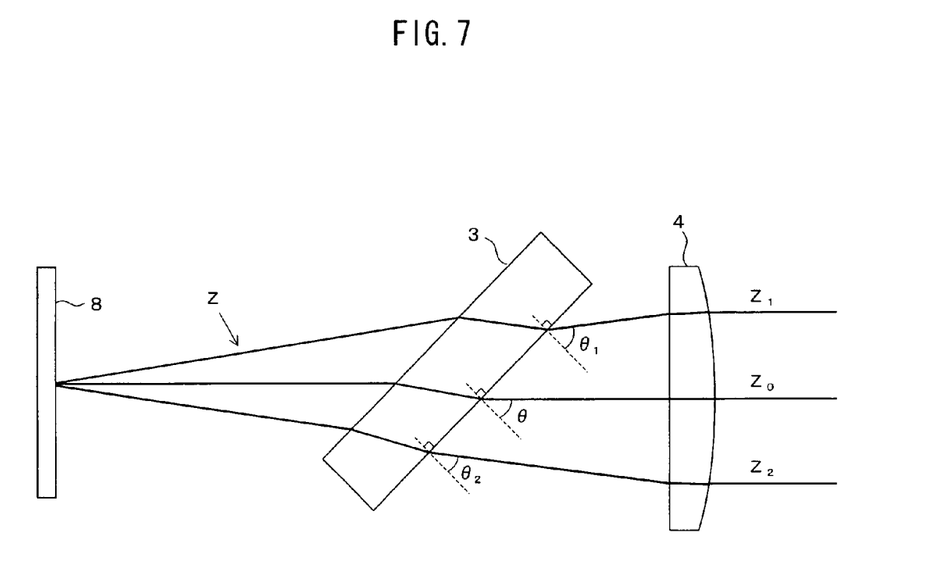
FIG. 7 is a view showing an example of the light receiving system for illustrating FIG. 6.

FIG. 6 shows graphs of an example of wavelength dependency and incident angle dependency of transmittance of a mirror. FIG. 7 is a view showing an example of a light receiving system for illustrating FIG. 6. FIG. 7 shows a half mirror 3, a collimating lens 4, and a light receiving section 8. Beam (only zero-dimensional beam Z is shown herein) projected from a light emitting device (not shown) and reflected at the optical disc is gathered to the light receiving section 8 through the collimating lens 4 and the half mirror 3. Since the reflected beam Z has a diameter of a beam of a certain width, when an incident angle of a central beam $Z_0$ to the mirror 3 is defined as $\theta$, an incident angle $\theta_1$ of an outer beam $Z_1$ to the mirror 3 becomes larger than $\theta$ ($\theta_1 > \theta$), and an incident angle $\theta_2$ of an outer beam $Z_2$ to the mirror 3 becomes smaller than $\theta$ ($\theta_2 < \theta$).

When $\theta_1$ and $\theta_2$ are set as $\theta_1 = \theta + 10°$ and $\theta_2 = \theta - 10°$, respectively, variations in transmittance for the respective wavelengths are shown in FIG. 6. A solid line in FIG. 6 indicates transmittance of the central beam $Z_0$ (incident angle $\theta$), a dashed-dotted line indicates transmittance of the outer beam $Z_1$ (incident angle $\theta_1 = \theta + 10°$), and a broken line indicates transmittance of the outer beam $Z_2$ (incident angle $\theta_2 = \theta - 10°$).

In FIG. 6, in view of variations in transmittance in the wavelength of 780 nm corresponding to the CD, the wavelength of 650 nm corresponding to the DVD, and the wavelength of 410 nm corresponding to the BD (as well as the HD-DVD), in a case of 780 nm (for the CD), the variation of the dashed-dotted line (deviation from the solid line) is larger than that of the broken line, and therefore it is found that the variation in transmittance is large with respect to beam incident at an angle ($\theta_1 = \theta + 10°$) larger than $\theta$ in this wavelength. On the other hand, in a case of 650 nm (for the DVD), variation of the broken line is larger than that of the dashed-dotted line, and therefore it is found that variation in transmittance is large with respect to beam incident at an angle ($\theta_2 = \theta - 10°$) smaller than $\theta$ in this wavelength. Also in a case of 410 nm (for the BD and HD-DVD), variation of the broken line is larger than that of the dashed-dotted line, and therefore it is found that variation in transmittance is large with respect to beam incident at an angle ($\theta_2 = \theta - 10°$) smaller than $\theta$ in this wavelength.

Thus, the transmittance of the mirror 3 varies with a wavelength of laser beam to be used and an incident angle of reflected beam to the mirror. However, there is no extreme difference in transmittance between the CD and the DVD as is evident from FIG. 6. On the other hand, when the BD (HD-DVD) and the CD/DVD are compared with each other, there is a large difference in transmittance. Therefore, in a two wavelength-compatible optical pickup compatible with only the CD and the DVD, effects by the wavelength dependency and the incident angle dependency of the transmittance are small, while in a three wavelength-compatible optical pickup compatible with the BD and the HD-DVD in addition to the CD and the DVD, effects by the wavelength dependency or the incident angle dependency of the transmittance become large.

Figure 8:
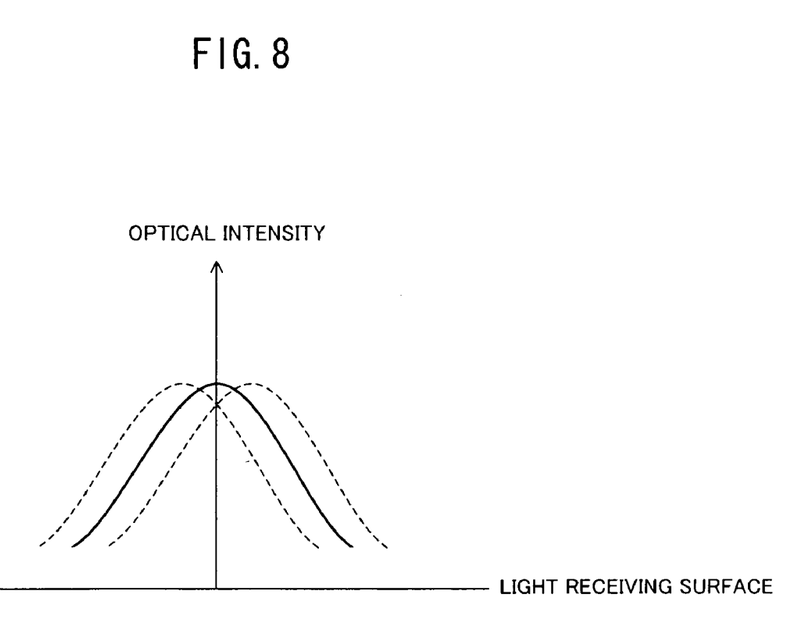
FIG. 8 is a view for illustrating shift of optical intensity distribution.

When the transmittance depends on the incident angle, the transmittances of the mirror 3 are different from each other at the center and the outer side of the laser beam. In FIG. 7, for example, if the transmittance for the outer beam $Z_1$ is high and the transmittance for the outer beam $Z_2$ is low, a transmitted light quantity of the outer beam $Z_1$ increases and a transmitted light quantity of the outer beam $Z_2$ decreases. Therefore, intensity of an optical spot received by the light receiving section 8 is maximized at a position shifted to the $Z_1$ side from a light receiving point of the central beam $Z_0$. On the other hand, in FIG. 7, if the transmittance for the outer beam $Z_1$ is low and the transmittance for the outer beam $Z_2$ is high, a transmitted light quantity of the outer beam $Z_1$ decreases and a transmitted light quantity of the outer beam $Z_2$ increases. Therefore, intensity of an optical spot received by the light receiving section 8 is maximized at a position shifted to the $Z_2$ side from the light receiving point of the central beam $Z_0$. FIG. 8 shows optical intensity distribution (Gaussian distribution) on a light receiving surface of the light receiving section 8. Shift of the optical intensity distribution occurs as shown by a broken line according to the difference in transmittance due to the incident angle described above.

While only the zero-dimensional beam is shown in FIG. 7, but practically, the +1 dimensional beam and the −1 dimensional beam for servo control, diffracted by a diffractive optics exist in addition to the zero-dimensional beam Z. Since these diffraction one-dimensional beams exist on opposite sides of the zero-dimensional beam Z, the transmittance of the mirror 3 for the diffraction one-dimensional beam varies dependent on the incident angle as in the outer beam $Z_1$ and the outer beam $Z_2$ with respect to the central beam $Z_0$ of the zero-dimensional beam. Therefore, when tracking error signals are detected based on the diffraction one-dimensional beam, there is a problem that, if shift of the optical intensity distribution occurs due to the variation in transmittance, an offset is generated in the tracking error signal and accuracy of tracking control is deteriorated. Thus, it becomes necessary to design an optical system in which stable received light signals can be obtained by suppressing displacement of the optical intensity distribution resulting from the incident angle dependency of the transmittance. However, any tactic for solving the above-mentioned problem is not described in aforesaid Japanese Unexamined Patent Publications No. 2004-139709 and No. 2004-103135.

SUMMARY OF THE INVENTION

In view of the above problem, it is an object of the present invention to enable to obtain stable signals by suppressing displacement of optical intensity distribution at a light receiving section in a multiple wavelength-adaptive optical pickup.

An optical pickup according to the present invention has a plurality of light emitting devices for projecting a plurality of laser beams having different wavelengths, and projects the laser beams having the respective wavelengths on information recording surfaces of optical discs corresponding to the respective wavelengths, and receives the beam reflected at the information recording surface by a light receiving section through a diffractive optics and a beam splitter to read information on the discs, wherein the light receiving section includes a first light receiving section for receiving zero-dimensional beam of the reflected beam and a second light receiving section for receiving a diffraction one-dimensional beam of the reflected beam. When an incident angle of a central beam of a zero-dimensional beam into the beam splitter is defined as θ and variation in transmittance or reflectance of the beam splitter becomes the maximum with respect to change in the incident angle from θ to a plus side or a minus side in any one of the wavelengths corresponding to the respective optical discs, a diffraction one-dimensional beam generated on an opposite side of the plus side or the minus side with respect to the zero-dimensional beam by the diffractive optics is received by the second light receiving section, and the received diffraction one-dimensional beam is used for detection of a signal for servo control.

In the present invention, a wavelength at which the variation in transmittance (reflectance) of the beam splitter is maximized is set as a standard. When the variation occurs on the side where the incident angle is larger than θ (plus side) in this wavelength, the diffraction one-dimensional beam on the side where the incident angle is smaller than θ (minus side) is used for detecting the signals for servo control, and when the variation occurs on the side where the incident angle is smaller than θ (minus side), the diffraction one-dimensional beam on the side where the incident angle is larger than θ (plus side) is used for detecting the signals for servo control. Thus, by taking aim at a wavelength in which the variation in transmittance (reflectance) is maximized and using the diffraction one-dimensional beam on the side where the variation is small, it is possible to minimize the effects by the incident angle dependency of the transmittance (reflectance) as a whole and to decrease the displacement of the optical intensity distribution at the light receiving section. Consequently, when tracking error signals are detected according to the diffraction one-dimensional beam, an offset due to the displacement of the optical intensity distribution is reduced, and accuracy of tracking control is improved.

In a typical embodiment of the present invention, a plurality of light emitting devices for projecting three kinds of laser beams having wavelengths of λ1, λ2 and λ3 (λ1>λ2>λ3) are provided. An infrared laser beam having a wavelength of λ1 is projected on an information recording surface of an optical disc for a CD, a red laser beam having a wavelength of λ2 is projected on an information recording surface of an optical disc for a DVD, and a blue laser beam having a wavelength of λ3 is projected on an information recording surface of an optical disc for a BD or a HD-DVD. Further, in the typical embodiment of the present invention, the diffractive optics for generating the diffraction one-dimensional beam is a holographic element.

In accordance with the present invention, it is possible to obtain stable signals with less offset by suppressing displacement of optical intensity distribution at a light receiving section resulting from the incident angle dependency of the transmittance of the beam splitter in a multiple wavelength-adaptive optical pickup.

DETAILED DESCRIPTION OF THE PREFERRED EMBODIMENT

Figure 1:
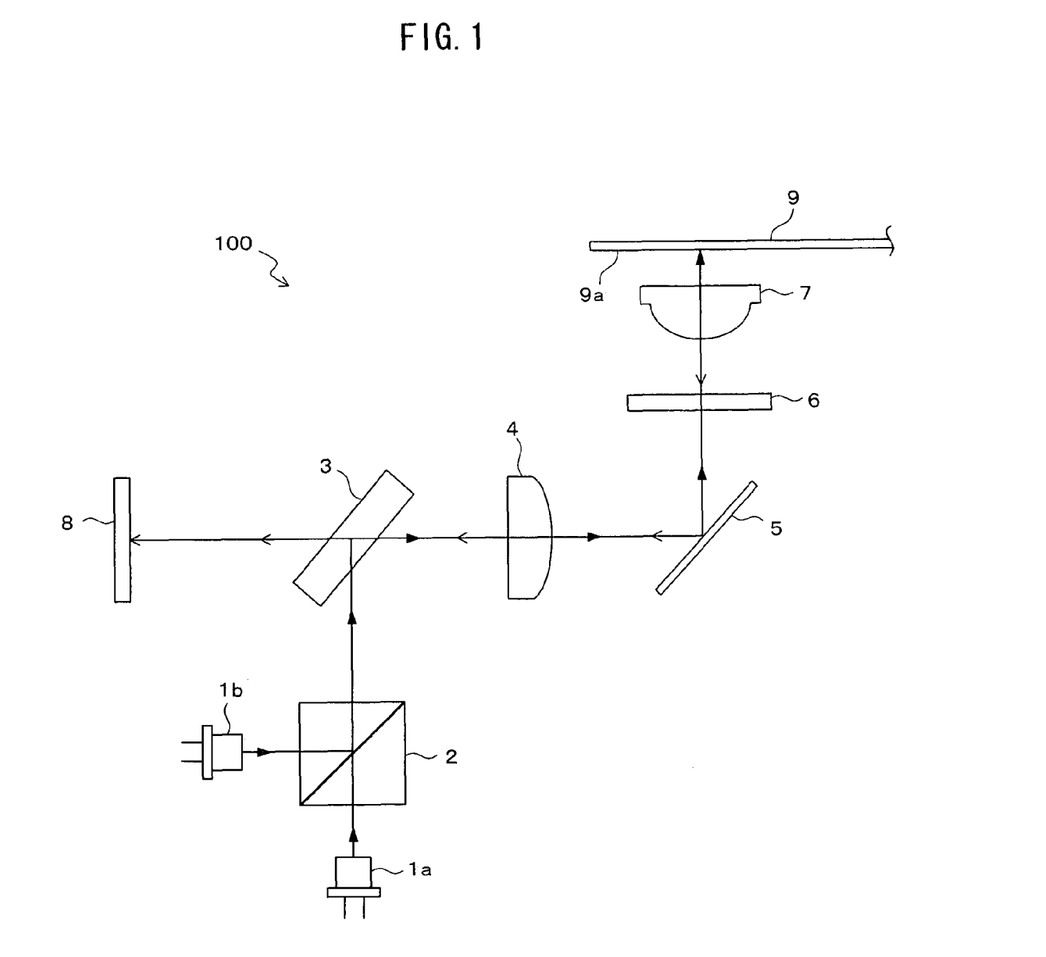
FIG. 1 is a view showing an optical constitution of an optical pickup according to the present invention.

Hereinafter, an embodiment of the present invention will be described with reference to the drawings. FIG. 1 is a view showing an optical constitution of an optical pickup 100 according to the present invention. A first light emitting device 1a for a CD and a DVD includes two semiconductor lasers for projecting an infrared laser beam having a wavelength of 780 nm and a red laser beam having a wavelength of 650 nm, respectively. A second light emitting device 1b for a BD and a HD-DVD includes a semiconductor laser for projecting a blue laser beam having a wavelength of 410 nm. A prism 2 transmits the laser beam from the light emitting device 1a and allows it to go straight, and reflects the laser beam from the light emitting device 1b to turn an optical path thereof by an angle of 90°. A half mirror 3 forms a beam splitter, and reflects the beam passed through the prism 2 at an angle of 90° toward a collimating lens 4, and transmits the beam from the collimating lens 4 directly. The collimating lens 4 converts the laser beam reflected at the half mirror 3 into a collimated beam. A total reflecting mirror 5 upwardly reflects the beam passed through the collimating lens 4 at an angle of 90°, a holographic element 6 forms a diffractive optics, an objective lens 7 condenses the laser beam on an information recording surface 9a of an optical disc 9, and a light receiving section 8 receive the beam reflected at the information recording surface 9a of the optical disc 9 through the respective optical elements 3 to 7.

The laser beam projected from one of the light emitting devices 1a and 1b passes through the prism 2, and is reflected at the half mirror 3 by an angle of 90°. The beam is converted to the collimated beam by the collimating lens 4, and then condensed on the information recording surface 9a of the optical disc 9 through the total reflecting mirror 5, the diffractive optics 6 and the objective lens 7 to form a minute optical spot. The beam reflected at the information recording surface 9a is separated into a zero-dimensional beam and a one-dimensional beam by the diffractive optics 6, and these separated beams are received by the light receiving section 8 through the total reflecting mirror 5, the collimating lens 4 and the half mirror 3.

Figure 2:
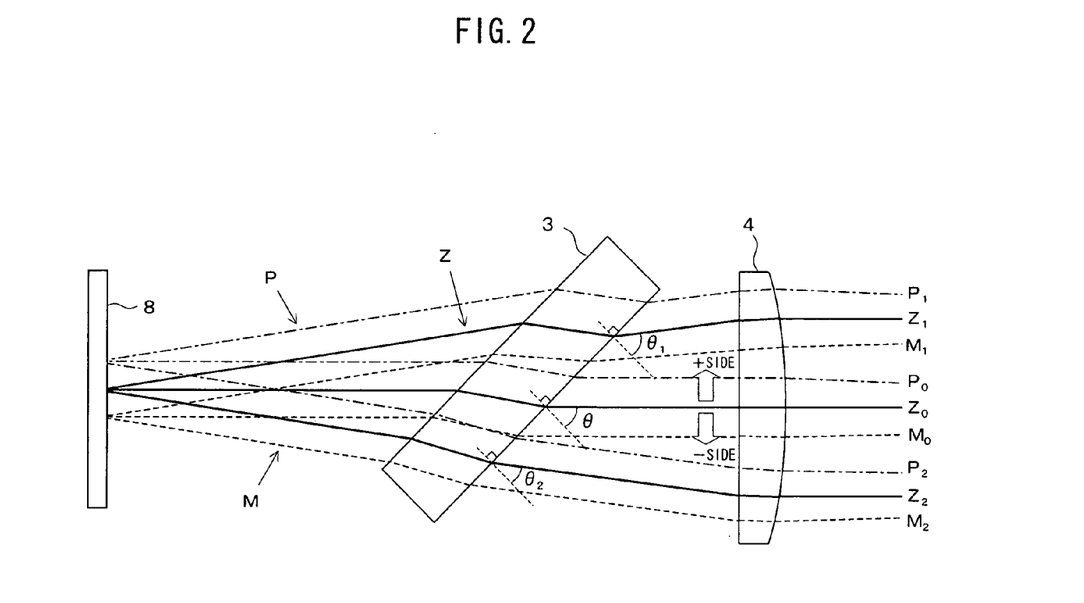
FIG. 2 is a view showing a light receiving system.

FIG. 2 is a view showing a light receiving system including the light receiving section 8, the half mirror 3, and the collimating lens 4. In FIG. 2, there are shown a zero-dimensional beam Z as shown in FIG. 7, a +1 dimensional beam P generated by diffraction at the holographic element 6, and a −1 dimensional beam M generated by diffraction at the holographic element 6. In the present invention, as described later, only any one of the +1 dimensional beam P and the −1 dimensional beam M is used, but both of them are shown in FIG. 2 for convenience sake. The zero-dimensional beam Z is used for reproducing information recorded on the information recording surface 9a of the optical disc 9, and the +1 dimensional beam P and the −1 dimensional beam M are used for detecting tracking errors and focusing errors. $Z_0$, $P_0$, and $M_0$ are central beams of the zero-dimensional beam, the +1 dimensional beam and the −1 dimensional beam, respectively. $Z_1$, $P_1$, and $M_1$ and $Z_2$, $P_2$, and $M_2$ are outer beams of the zero-dimensional beam, the +1 dimensional beam and the −1 dimensional beam, respectively. The +1 dimensional beam P is formed on a side (plus side) where an incident angle into the half mirror 3 becomes larger than θ, and the −1 dimensional beam M is formed on a side (minus side) where the incident angle into the half mirror 3 becomes smaller than θ, with respect to the central beam $Z_0$ of the zero-dimensional beam Z.

In the above-mentioned constitution, a mirror having a transmittance characteristic as shown in FIG. 6 described above is employed as the half mirror 3. While reflectance (=100−transmittance [%]) can be similarly used in place of transmittance, the present invention will be described with the transmittance hereinafter. In FIG. 6, when making a comparison between the incident angle dependency of the transmittance in the respective wavelengths corresponding to the CD, DVD, and BD (HD-DVD), in other words, the variation in the transmittance with respect to the change in the incident angle (change to the plus side or minus side with respect to θ in FIG. 2), it is found that the variation 5 in the transmittance is maximized on the plus side of the CD. Thus, in the present embodiment, the incident angle dependency of the transmittance in the wavelength (780 nm) corresponding to the CD is set as a standard, and the diffraction one-dimensional beam generated on the minus side, opposite to the plus side where the maximum variation in the transmittance is generated, is used for detecting signals for servo control. In FIG. 2, since the −1 dimensional beam M exists on the minus side relative to θ, this −1 dimensional beam M is used. Accordingly, light receiving elements in the light receiving section 8 are arranged in such a way that only the zero-dimensional beam Z and the −1 dimensional beam M out of the diffraction one-dimensional beams are received by the light receiving section 8.

Figure 3:
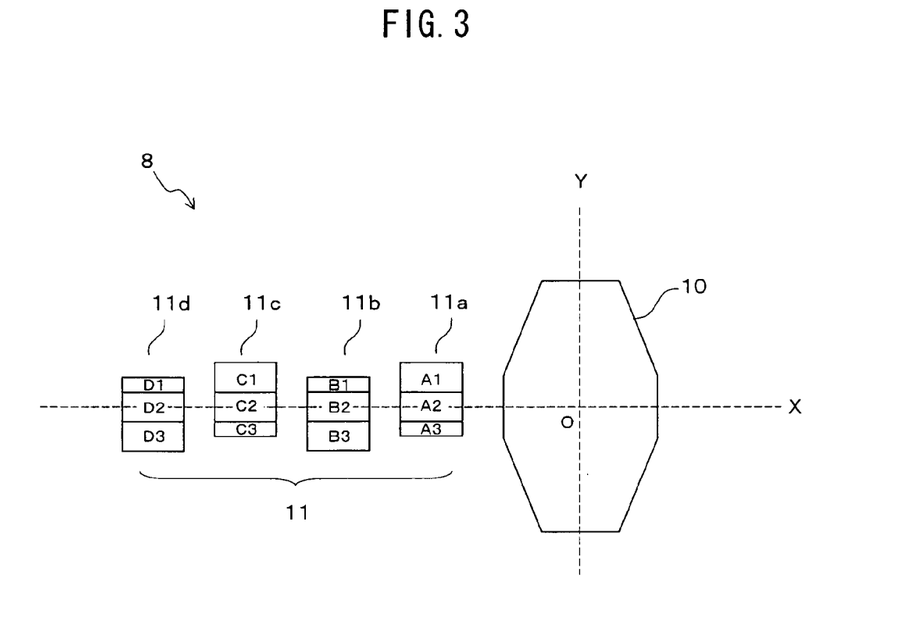
FIG. 3 is a view showing an example of arranging light receiving elements in a light receiving section.

FIG. 3 is a view showing an example of arranging the light receiving elements in the light receiving section 8. The light receiving section 8 includes a light receiving section 10 (a first light receiving section) for receiving the zero-dimensional beam Z divided by the holographic element 6, and a light receiving section 11 (a second light receiving section) for receiving the −1 dimensional beam M divided by the holographic element 6. While only one of the −1 dimensional beams M is shown in FIG. 2 for convenience sake, the −1 dimensional beam M is practically divided into four −1 dimensional beams (Ma, Mb, Mc, and Md in FIG. 4) by the holographic element 6. Therefore, the light receiving section 11 is formed by four light receiving elements 11a to 11d for receiving respective −1 dimensional beams. These light receiving elements 11a to 11d are arranged in parallel (X direction in FIG. 3) with a diameter direction of the optical disc 9.

Each of the light receiving elements 11a to 11d is formed by three light receiving cells divided in a direction (Y direction in FIG. 3) orthogonal to the direction of arrangement. A1 to A3 are light receiving cells forming the light receiving element 11a. B1 to B3 are light receiving cells forming the light receiving element 11b. C1 to C3 are light receiving cells forming the light receiving element 11c. D1 to D3 are light receiving cells forming the light receiving element 11d. The three light receiving cells in each of the light receiving elements are formed by a wide light receiving cell (A2, B2, C2, D2) positioned at a center, a wide light receiving cell (A1, B3, C1, D3) positioned at one side thereof, and a narrow light receiving cell (A3, B1, C3, D1) positioned at the other side. When a center of the light receiving section 10 is assumed as an origin O and an X-axis and a Y-axis are designated as shown in FIG. 3, the central light receiving cells A2, B2, C2, and D2 are aligned on the X-axis. Accordingly, each of the light receiving elements 11a to 11d is arranged so as to be asymmetric with respect to the X-axis. The arrangement relation of the three light receiving cells is inverse between adjacent light receiving elements (for example, 11a and 11b).

Figure 4:
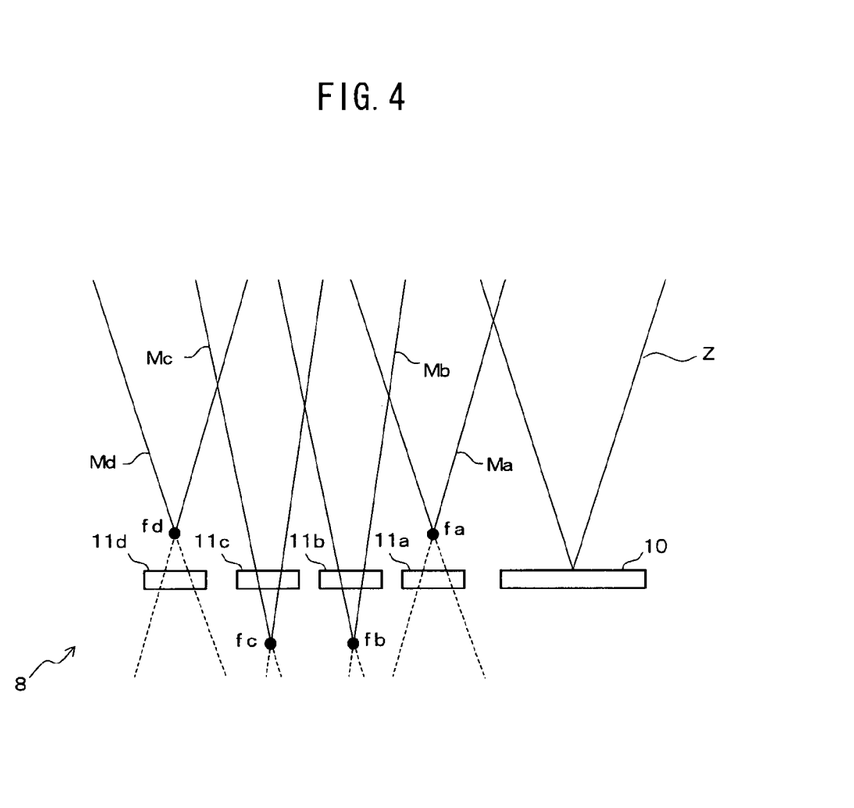
FIG. 4 is a view schematically showing a state of receiving a zero-dimensional beam and a −1 dimensional beam.

FIG. 4 is a view schematically showing a state of receiving the zero-dimensional beam and the −1 dimensional beam. There are shown a zero-dimensional beam Z, −1 dimensional beams Ma to Md divided into four. The zero-dimensional beam Z is received by the light receiving section 10. This zero-dimensional beam Z is for reading information recorded on the optical disc 9. Reproduction signals are generated according to output signals from the light receiving section 10. The −1 dimensional beams Ma to Md are received by the light receiving elements 11a to 11d, respectively. In this case, the −1 dimensional beams Ma and Md have the same focal length (a first focal length), and form focuses fa and fd at positions anterior to light receiving surfaces of the light receiving elements 11a and 11d. The −1 dimensional beams Mb and Mc have the same focal length (a second focal length), and form focuses fb and fc at positions posterior to light receiving surfaces of the light receiving elements 11b and 11c. These −1 dimensional beams Ma to Md are for detecting focusing errors and tracking errors. Focusing error signals and tracking error signals are generated according to outputs from the light receiving elements 11a to 11d.

Figure 5:
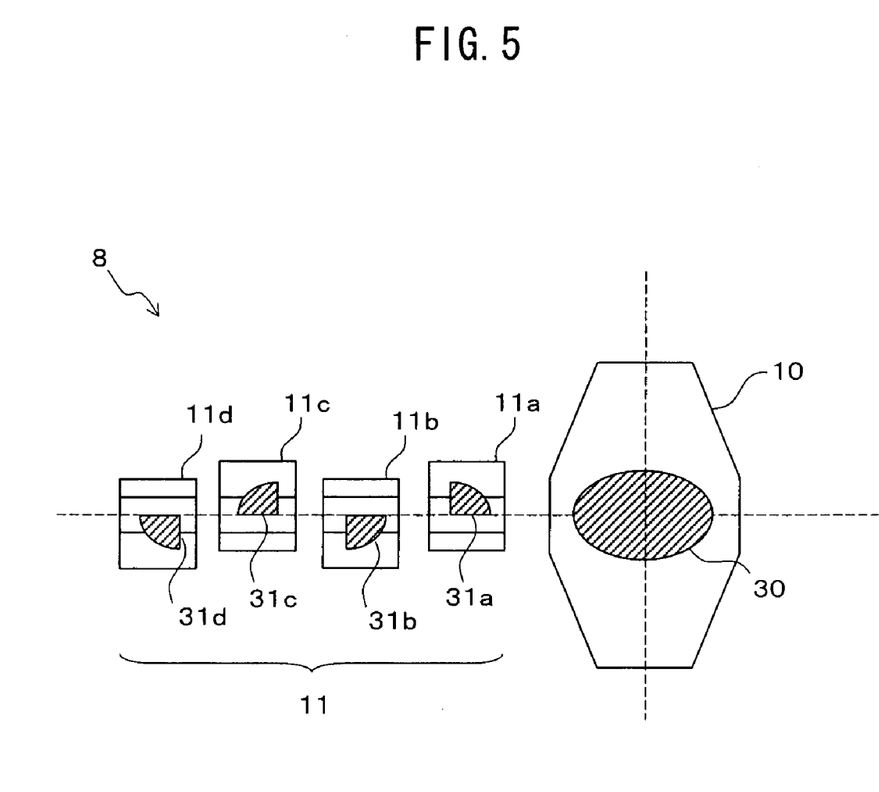
FIG. 5 is a view showing an example of an optical spot formed on the light receiving section by the zero-dimensional beam and the −1 dimensional beam.

FIG. 5 shows an example of an optical spot formed on the light receiving section 8 by the zero-dimensional beam and the −1 dimensional beam. There are shown an optical spot 30 formed on the light receiving section 10 by the zero-dimensional beam Z, and optical spots 31a to 31d formed on the light receiving elements 11a to 11d by the −1 dimensional beams Ma to Md. The optical spots 31a to 31d on the light receiving elements 11a to 11d are formed into sectors, respectively, due to light division by the holographic element 6. As a result of forming these optical spots 31a to 31d on the light receiving section 11, by performing predetermined arithmetic processes on output signals from the respective light receiving cells in the light receiving elements 11a to 11d, focusing error signal and tracking error signal for servo control can be obtained. For example, the focusing error signal S is computed by the following equation:

$$S=(A2+B1+B3+C1+C3+D2)-(A1+A3+B2+C2+D1+D3)$$

Wherein, A2, B1, B3, etc. represent outputs obtained from the light receiving cells A2, B1, B3, etc. respectively in FIG. 3.

Thus, in the present embodiment, it has been noted that, when the mirror 3 having the characteristic shown in FIG. 6 is used, the variation in the transmittance with respect to the incident angle is maximized in the wavelength (780 nm) corresponding to the CD, and the maximum variation occurs on the plus side where the incident angle is larger than θ. Therefore, by using the −1 dimensional beam M on the minus side where the variation in the transmittance is small, it is possible to suppress the effects by the incident angle dependency of the transmittance and reduce displacement of the optical intensity distribution in the light receiving section 8 at the time of replaying a CD. Consequently, when tracking errors are detected according to the −1 dimensional beam M, an offset in the tracking error signal due to the displacement of the optical intensity distribution is reduced, and accuracy of tracking control is improved.

On the other hand, in the DVD or the BD (HD-DVD), as seen from FIG. 6, the variation in the transmittance is larger on the minus side rather than on the plus side. Therefore, when the −1 dimensional beam M on the minus side is used while taking aim at the CD as described above, the variation in the transmittance becomes large for the DVD or the BD (HD-DVD). However, in a case of the DVD or the BD (HD-DVD), since there is not so extreme difference in the transmittance between the plus side and the minus side in contrast to a case of the CD, detrimental effects due to using of the −1 dimensional beam M is small. Accordingly, by using the −1 dimensional beam M while taking aim at the CD to suppress the variation in the transmittance in a case of the CD where the incident angle dependency of the transmittance is the largest, the effects by the incident angle dependency of the transmittance can be minimized as a whole, and an optical system which is optimized to the three wavelengths can be obtained.

In the above description, an example in which the mirror 3 having the characteristic shown in FIG. 6 is employed has been described. However, FIG. 6 shows just an example. It is apparent that a mirror having another characteristic may be employed. In such a case, if the variation in the transmittance of the mirror 3 is maximized, for example, in the wavelength (650 nm) corresponding to the DVD and the maximum variation occurs on the minus side where the incident angle is smaller than θ, by using the +1 dimensional beam P (FIG. 2) on the plus side where the variation in the transmittance is small, it is possible to suppress the effects by the incident angle dependency of the transmittance, reduce the displacement of the optical intensity distribution in the light receiving section 8 at the time of replaying a DVD, and minimize the effects by the incident angle dependency of the transmittance as a whole.

Further, the optical constitution shown in FIG. 1 is also just an example, and another constitution can be employed. For example, in FIG. 1, the light emitting devices 1a and 1b and the prism 2, and the light receiving section 8 can be replaced in position. In FIG. 1, the laser beam from the collimating lens 4 is upwardly reflected at the total reflecting mirror 5 by an angle of 90°, but a configuration, in which an optical path from the half mirror 3 to the objective lens 7 is straightened to omit the total reflecting mirror 5, may be employed.

In the embodiment described above, an example in which the half mirror 3 is used as the beam splitter has been described. However, a prism may be used in place of the half mirror. In the embodiment described above, while an example in which the holographic element is used as the diffractive optics has been described, a diffractive optics other than the holographic element may be used as long as it can cause a spectral state as shown in FIG. 4. Further, in the embodiment described above, while the three wavelength-compatible optical pickup 100 has been described as an example, the present invention is applicable to a two wavelength-compatible optical pickup, and also applicable to a four or more wavelength-adaptive optical pickup.

What is claimed is:

1. An optical pickup comprising a plurality of light emitting devices for projecting three kinds of laser beams with wavelengths of λ1, λ2 and λ3 (λ1>λ2>3), projecting an infrared laser beam having the wavelength of λ1 on an information recording surface of an optical disc for a CD (compact disc), projecting a red laser beam having the wavelength of λ2 on an information recording surface of an optical disc for a DVD (digital versatile disc), projecting a blue laser beam having the wavelength of λ3 on an information recording surface of an optical disc for a BD (Blu-ray Disc) or a HD-DVD (high definition digital versatile disc), and receiving the beam reflected at the information recording surface by a light receiving section through a diffractive optics and a beam splitter to read information on the optical disc, wherein the diffractive optics is a holographic element, the light receiving section includes a first light receiving section for receiving a zero-dimensional beam of the reflected beam, and a second light receiving section for receiving a diffraction one-dimensional beam of the reflected beam, when an incident angle of a central beam of the zero-dimensional beam into a beam splitter is defined as θ and variation in transmittance or reflectance of the beam splitter become a maximum with respect to change in the incident angle from θ to a plus side or a minus side in any one of the wavelengths λ1, λ2 and λ3 corresponding to the respective optical discs, the diffraction one-dimensional beam generated on an opposite side of the plus side or the minus side with respect to the zero-dimensional beam by the holographic element is received by the second light receiving section, and the received diffraction one-dimensional beam is used for detection of a signal for servo control.

2. An optical pickup comprising a plurality of light emitting devices for projecting a plurality of laser beams having different wavelengths, projecting the laser beams having the respective wavelengths on information recording surfaces of optical discs corresponding to the respective wavelengths, and receiving the beams reflected at the information recording surfaces by a light receiving section through a diffractive optics and a beam splitter to read information on the discs, wherein the light receiving section includes a first light receiving section for receiving a zero-dimensional beam of the reflected beam, and a second light receiving section for receiving a diffraction one-dimensional beam of the reflected beam, when an incident angle of a central beam of the zero-dimensional beam into a beam splitter is defined as $\theta$ and variation in transmittance or reflectance of the beam splitter become a maximum with respect to change in the incident angle from $\theta$ to a plus side or a minus side in any one of the wavelengths corresponding to the respective optical discs, the diffraction one-dimensional beam generated on an opposite side of the plus side or the minus side with respect to the zero-dimensional beam by the diffractive optics is received by the second light receiving section, and the received diffraction one-dimensional beam is used for detection of a signal for servo control.

* * * * *